Patented Oct. 17, 1939

2,176,490

UNITED STATES PATENT OFFICE 2,176,490

DENATURED ALCOHOL CONTAINING A DICHLOROALKYL ETHER

Louis J. Figg, Jr., and James W. Rhea, Kingsport, Tenn., assignors to Eastman Kodak Company, Rochester, N. Y., a corporation of New Jersey No Drawing. Application September 28, 1937, Serial No. 166,121

3 Claims. (Cl. 202—77)

This invention relates to the denaturing of ethyl alcohol, and to alcohol so denatured.

It is an object of our invention to provide a denaturant which will render ethyl alcohol containing it unfit for use as a beverage, which cannot be economically removed from the alcohol by any known methods, which will not render the alcohol unfit for industrial uses in which denatured alcohol has customarily been employed, and which will be free from methanol. Other objects will hereinafter appear.

We have discovered that a dichloroalkyl ether selected from the group consisting of dichloromethyl ether and dichloroethyl ether is an effective denaturant for alcohol. In denaturing ethyl alcohol with our novel denaturants, we may use from 0.5 to 5 parts of the dichloroalkyl ether, or even more, per 100 parts of 95% alcohol. These dichloroalkyl ethers may be used alone in denaturing, or they may be used in conjunction with denaturing materials derived from the destructive distillation of hardwood, such as those which are described in United States Patents 1,975,090; 1,975,091; and 1,975,092. Likewise, they may be used in conjunction with aliphatic ketones, or with aliphatic ketones and the hardwood denaturants just mentioned or with a lower alkyl acetal, such as acetal or dimethyl acetal, or with amino compounds, or with any other denaturants with which they may be found to be compatible. From 0.5 to 5 parts, or even more, of the combinations may be used per 100 parts of 95% alcohol. When our dichloroalkyl ethers are used in conjunction with acetal or dimethyl acetal, not more than 1 part of the denaturant combination per 100 parts of 95% alcohol is necessary, although more may be used if desired.

When our novel ethers are used in conjunction with ketones azeotropes are formed with alcohol and water which distil over in all fractions throughout the entire boiling range of the denatured alcohol.

What we claim as our invention and desire to be secured by Letters Patent of the United States is:

1. Industrial ethyl alcohol denatured with 0.5 to 5 parts of a dichloroalkyl ether selected from the group consisting of dichloromethyl ether and dichloroethyl ether, as an essential denaturing element, per 100 parts of 95% ethyl alcohol.

2. Industrial ethyl alcohol denatured with 0.5 to 5 parts of dichloromethyl ether, as an essential denaturing element, per 100 parts of 95% ethyl alcohol.

3. Industrial ethyl alcohol denatured with 0.5 to 5 parts of dichloroethyl ether, as an essential denaturing element, per 100 parts of 95% ethyl alcohol.

LOUIS J. FIGG, JR.
JAMES W. RHEA.